United States Patent [19]

Krogh

[11] Patent Number: 4,526,526
[45] Date of Patent: Jul. 2, 1985

[54] APPARATUS FOR INTERNAL COOLING IN EXTRUSION OF TUBE-SHAPED OBJECTS

[75] Inventor: Björn Krogh, Sollentuna, Sweden

[73] Assignee: AGA Aktiebolag, Lidingo, Sweden

[21] Appl. No.: 488,952

[22] Filed: Apr. 27, 1983

[30] Foreign Application Priority Data

Apr. 29, 1982 [SE] Sweden ................. 8202687

[51] Int. Cl.³ .................................... B29F 3/08
[52] U.S. Cl. ................................ 425/71; 264/558;
264/560; 264/565; 425/72 R; 425/143; 425/378 R
[58] Field of Search .............. 425/71, 72 R, 379 R, 425/378 R, 143; 264/558, 563–565, 560, 237, 348, 28

[56] References Cited

U.S. PATENT DOCUMENTS

| 3,170,011 | 2/1965 | Cheney et al. ............ 425/379 R |
| 3,522,337 | 7/1970 | Ball .............................. 264/558 |
| 3,618,169 | 11/1971 | Coast ........................... 264/565 |
| 4,069,282 | 1/1978 | Gutermuth et al. .......... 264/558 |
| 4,088,724 | 5/1978 | Kuhnert ....................... 264/558 |
| 4,115,048 | 9/1978 | Alderfer et al. .............. 264/565 |
| 4,212,171 | 7/1980 | Soecknick ..................... 264/28 |
| 4,389,366 | 6/1983 | Hoesslin et al. .............. 264/558 |

FOREIGN PATENT DOCUMENTS

| 2424095 | 11/1975 | Fed. Rep. of Germany . |
| 2456386 | 6/1976 | Fed. Rep. of Germany .... 425/72 R |
| 2634580 | 2/1978 | Fed. Rep. of Germany ...... 264/558 |
| 2051961 | 4/1971 | France ............................ 264/237 |
| 466114 | 7/1975 | U.S.S.R. ......................... 425/72 R |
| 516536 | 6/1977 | U.S.S.R. ............................ 425/71 |

Primary Examiner—Jeffery Thurlow
Attorney, Agent, or Firm—Pollock, Vande Sande & Priddy

[57] ABSTRACT

A method and apparatus for internal cooling of extruded tube-shaped objects wherein liquid nitrogen is inserted into the tube and evaporated there out of contact with the tube on account of the heat from the tube whereafter only evaporated nitrogen is made to pass through the inner surfaces of the extruded tube. The apparatus for evaporation of the liquid nitrogen and for conduction of the gasified nitrogen comprises a cylinder-shaped member with good thermal conductivity placed in the shaped tube adjacent to the extruder nozzle. Provided in the closed end of the cylindrical member are nozzle members with a connection to a supply line for liquid nitrogen inserted through the extruder nozzle. Provided in the opposite end of the cylindrical member are openings for passage of the evaporated nitrogen out towards the shaped tube. The temperature in the evaporating arrangement near the said openings is regulated in such a manner that the temperature is always higher than the evaporation temperature of the nitrogen at the pressure prevailing in the tube, whereby all supplied nitrogen is evaporated before contacting inner surfaces of the extruded tube.

7 Claims, 3 Drawing Figures

APPARATUS FOR INTERNAL COOLING IN EXTRUSION OF TUBE-SHAPED OBJECTS

FIELD OF INVENTION

This invention relates to a method and an apparatus for internal cooling of extruded tube-shaped objects, such as for example plastic tubes, in order to prevent oxidation and mechanical distortion of the internal wall of the tube, wherein liquid nitrogen is introduced into the tube-shaped object (the tube) and the liquid nitrogen is evaporated by means of an evaporation device which is provided with openings at one end.

BACKGROUND OF THE INVENTION

In the manufacture of tube-shaped objects such as plastic tubes a tube which is very soft and hot is discharged from the extruder nozzle of the machine. The tube is cooled externally. Nearest to the nozzle, use is made of a water-cooled cylinder which also constitutes a calibration device for the outside diameter of the tube. A water bath and additional cooling equipment through which the tube is made to pass occurs after the cylinder. Compressed air is introduced into the shaped tube to impart a positive pressure in the tube in order for it to be able to be pressed against the diameter-determining outer cylinder. To maintain the positive pressure in the tube so that it does not collapse a drag plug is provided in the shaped tube at a distance from the nozzle.

The use of compressed air in the tube nevertheless has the disadvantage that the internal surface of the tube readily becomes oxidized. If the air contains water particles these, when impinging upon the interior wall of the tube, may make such marks in the plastic that they in due course can constitute indications of fracture. Moreover, at higher extrusion velocities the plastic tube becomes so hot that the internal surface thereof which is in contact with the compressed air becomes heavily oxidized so that the mechanical strength of the finished tube falls below permissible values. In the manufacture of thick-walled tubes, severe tangential tensile stresses also arise in the material on the inside of the tube, causing the strength to deteriorate. This is due to the fact that the external diameter of the tube is determined with a calibration cylinder at the same time as the tube is cooled severely on the outside while its internal surface is still very hot. As the internal surface gradually cools and shrinks tensile stresses are thus incurred on the inside of the tube, which reduces the ability of the tube to withstand internal positive pressures. Consequently, the tube becomes extra sensitive to the indications of fracture which may arise in the surface of the tube in the form of scratches and other defects. Hitherto, therefore, it has been extremely difficult and occasionally impossible to manufacture certain types of tubes with a specific ratio between wall thickness and external diameter, for instance where this ratio is 15:100.

DISCLOSURE OF THE INVENTION

The object of the present invention is to provide a method and an apparatus for performance of the method wherein the disadvantages of oxidation and indications of fracture have been eliminated and where the extrusion velocity does not have to be limited as previously. The method according to the invention is characterized in that solely evaporated nitrogen from the evaporation device is made to pass along the inside wall of the shaped tube and in the first instance along the portion of the tube located adjacent to the extruder nozzle, the temperature in the evaporation device in the vicinity of its openings being controlled in such a manner that the temperature is always higher than the evaporation temperature of the nitrogen at the pressure prevailing in the tube, whereby all added nitrogen is evaporated.

The apparatus for performance of this method is characterized largely in that the evaporation device comprises a cylindrical member 13,19 located adjacent to the extruder nozzle within the shaped tube and provided with end plates, said cylindrical member having good thermal conductivity, in that nozzle members 12,21 are arranged within the closed end of the cylindrical member with a connection to a supply line for liquid nitrogen introduced through the extruder nozzle, and in that apertures 15,23 in the opposite end of the cylindrical member for passage of the evaporated nitrogen are so disposed that the evaporated nitrogen passes between the outermost diameter of the cylindrical member and the inside diameter of the tube along the greater portion of the length of the cylindrical member and in that a temperature sensing means 27 is provided in the lower part of the cylindrical member adjacent to its openings and connected to a control system, known per se, for control of the supply of liquid nitrogen.

BRIEF DESCRIPTION OF THE DRAWINGS

The invention will now be further described with reference to the accompanying drawings, where extrusion of plastic tubes is shown as an application example, in which.

DESCRIPTION OF BEST MODE AND OTHER EMBODIMENTS

Figure 1:
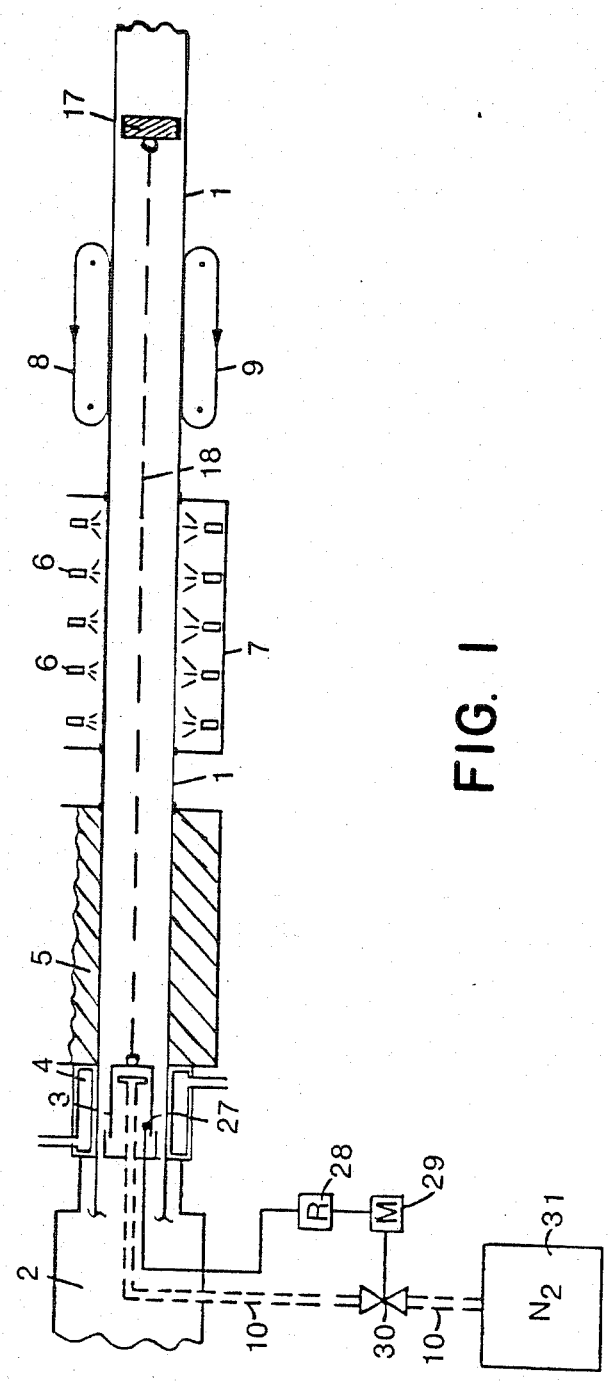
FIG. 1 shows in principle an arrangement for production of plastic tubes.

FIG. 1 illustrates the principle for the production of plastic tubes. The tube 1 is extruded from the nozzle 2 of the machine at which there is provided a device 3 for internal cooling of the tube. The device and the tube are surrounded by an outer water-cooled cylinder 4 which is followed by a cooling bath 5 and yet another cooling device 7 which comprises a number of water distributors 6. The tube is drawn along with the aid of a draw unit which is provided with two draw bands 8 and 9 and which feeds with a wanted velocity, the wall thickness of the tube 1 being determined by the drawing speed. An increase in the drawing velocity imparts a thinner wall thickness to the tube. The external diameter of the tube is determined by the internal diameter of the calibrating outer cylinder 4. A positive pressure prevailing in the shaped tube not only prevents the tube from collapsing but also presses the tube towards the outer cylinder 4. In order to maintain a positive pressure in the shaped tube a drag plug 17 is provided at a relatively great distance from the nozzle. The plug is kept in place in the tube by means of a cord 18 or the like which is attached to the device for internal cooling of the tube 1.

Figure 2:
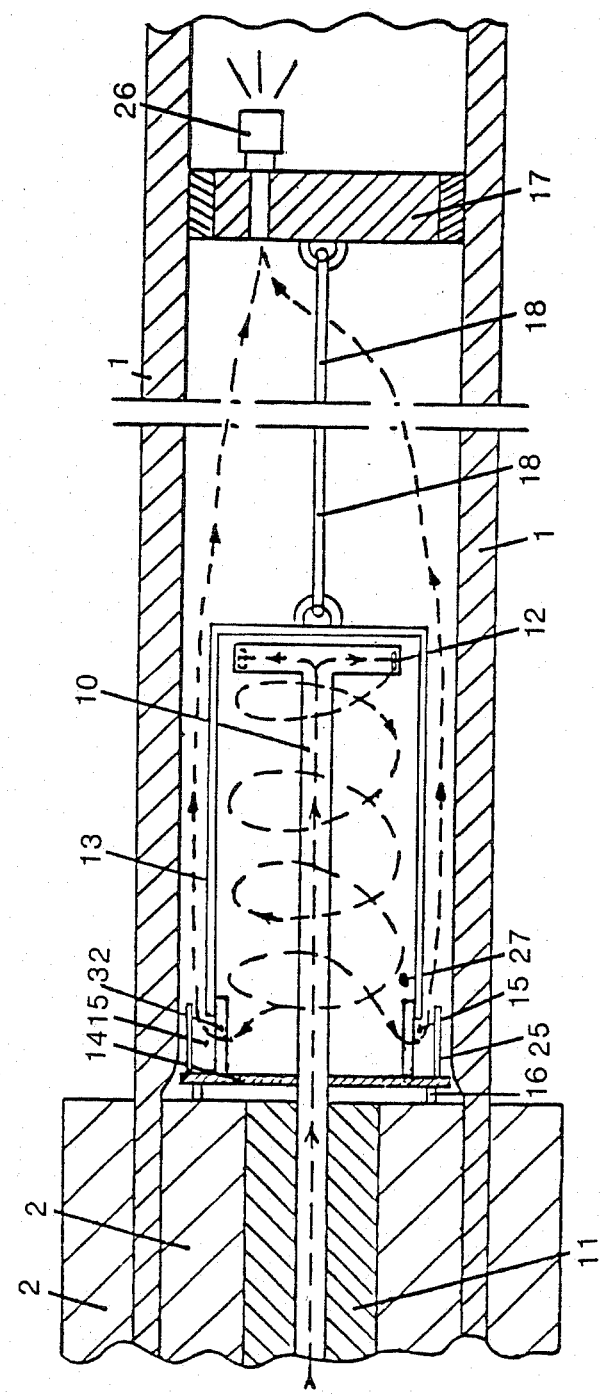
FIG. 2 shows an apparatus for internal cooling of an extruded tube.

An embodiment of the apparatus for the internal cooling is shown in FIG. 2. It comprises a cylinder 13 of a material with good thermal conductivity. At one end, the cylinder is provided with an end plate and at its other end is attached to a heat shield 14 of a material with poor thermal conductivity. The shield is disposed at a certain distance from the nozzle by means of spacers and attachment means 16, whereby the cylinder 13 has thus been effectively screened from the hot nozzle 2. A nozzle member 12 is provided in the farmost portion of the cylinder 13 viewed from the nozzle. The said nozzle member communicates through a supply line 10 with a source (not shown) for liquid nitrogen. In order to prevent the liquid nitrgoen from being heated up upon passing through nozzle 2 the line 10 is provided with insulations 11. In the nozzle member 12 there are a number of holes so disposed that tangential discharge of the liquid nitrogen is obtained.

In consequence of the effective insulation of the supply line the nitrogen will thus be sprayed out in liquid phase into the cylinder 13 from the nozzle member 12. The cylinder 13 is surrounded by the hot extruded tube 1. The heat of the tube 1 will now be transmitted through radiation, conduction and convection to the cylinder 13, whereby the liquid nitrogen is gasified. The gasified nitrogen passes out through apertures 15 in the cylinder 13, which are provided in the jacket surface of the cylinder adjacent to the heat shield 14 between attachment means 32. The cold nitrogen gas flow passes from the apertures 15 between the outer surface of the cylinder 13 and the internal surface of the tube 1 and then fills the tube from the cylinder 13 to the drag plug 17. By this means, the cooling properties of the nitrogen are exploited to the greatest possible extent on the plastic tube. Moreover, it is possible to conduct air residues from the extrusion start from a hot zone in the tube to colder portions of the tube.

It has been found however that an excessively powerful cooling is accomplished on the plastic tube internally in the zone immediately outside the extruder nozzle, i.e. the zone where the tube wall is changed from the slot width in the extruder nozzle to the final thickness. In order to permit the plastic material to be shaped gently to the correct wall thickness a guide plate 25 is therefore introduced, manufactured of material with poor thermal conductivity so that the cold nitrogen gas passes the critical shaping zone without cooling it.

The nitrogen is kept in the plastic tube at a gauge pressure of approx. 0.5 bar. As already mentioned, this positive pressure prevents the soft plastic tube 1 from collapsing and also causes the tube to be pressed out towards the outer calibrating cylinder 4. As nitrogen is supplied continuously, nitrogen must also be discharged and to permit this an overpressure valve 26, for example a spring-loaded valve, is provided in the drag plug 17. This valve opens in response to a specific pressure in the tube and continuously releases the necessary amount of nitrogen gas so that the pressure is kept constant.

The cylinder described heretofore thus comprises not only in evaporator in which the introduced liquid nitrogen is evaporated but also a gas conductor which conducts the gas between the cylinder and the shaped tube.

Figure 3:
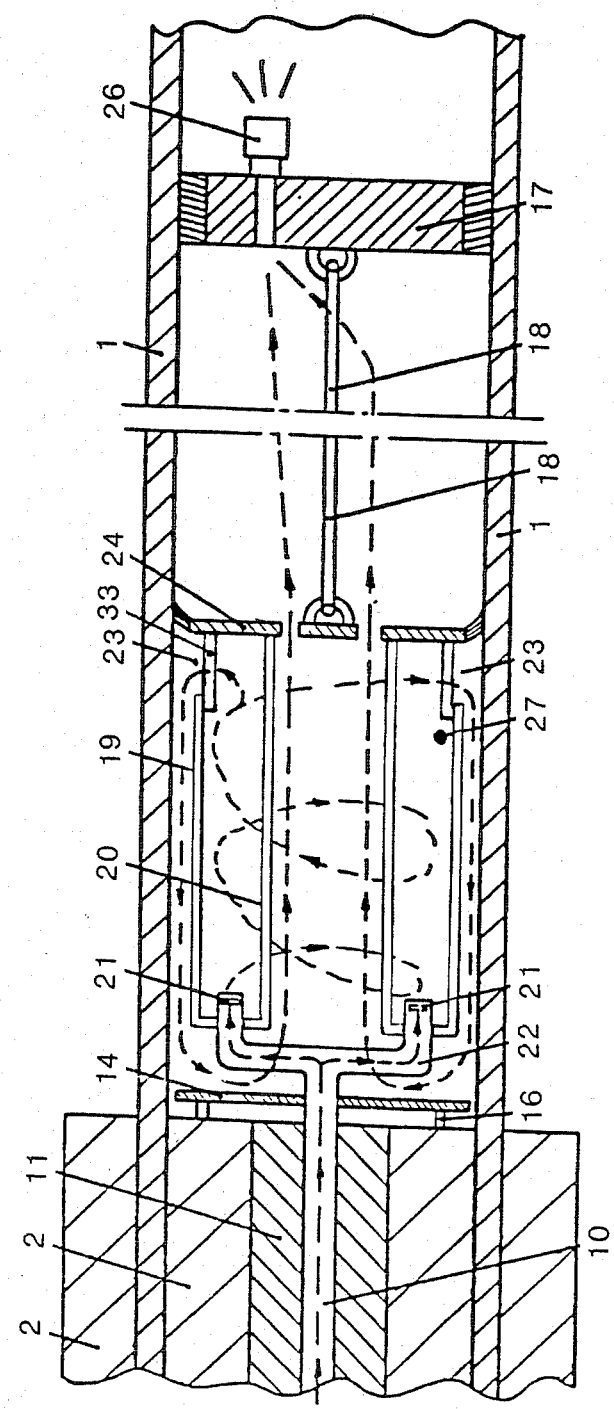
FIG. 3 shows another embodiment of the apparatus for the purpose according to FIG. 2.

Shown in FIG. 3 is another embodiment of the cylinder. Here, too, use is made of a heat shield 14 which by means of attachment means 16 is secured adjacent the nozzle 2. In this embodiment, a tube 20 is mounted concentrically in the cylinder 19. The cylinder is provided with end plates which, however, do not cover the tube 20. The end plate 24 which is farthest away from the extruder nozzle is provided with seals against the shaped tube. In this portion of the cylinder, holes 23 are made in the jacket surface for passage of the evaporated nitrogen. The nitrogen in liquid form is introduced via line 10 through the extruder nozzle and branch lines 22 to nozzle members 21 which are provided in the chamber between the cylinder wall and the wall of the tube. The liquid nitrogen is sprayed out tangentially through the nozzle members and is conducted under gasification through the cylinder 19 as far as the apertures 23. The gasified nitrogen is introduced into the chamber between the cylinder 19 and the shaped tube 1 against the extruder nozzle and in due course passes into the centrally disposed tube 20 and thereafter through the end plate 24 out into the tube 1. By this arrangement the flow of nitrogen gas is obtained in the opposite direction towards the pipe tube. The cooling of the tube will by this means be somewhat less violent than what is the case in the cooling arrangement according to FIG. 2.

In supplying the liquid nitrogen it is of the utmost importance for the temperature in the evaporator not to fall to the evaporation temperature of the nitrogen. At this latter evaporation temperature a surplus of liquid nitrogen may be obtained in the bottom of the evaporator. This surplus of liquid nitrogen may pass out through the open part of the evaporator and drop down into the plastic tube and as a result the internal surface of the plastic tube will become severely distorted. The supply of liquid nitrogen is therefore regulated in such manner that the temperature in the evaporator in the vicinity of its open end is always higher that the evaporating temperature of the nitrogen at the pressure prevailing in the tube. By this means all liquid nitrogen will be evaporated and accordingly maximal cooling will be obtained in the tube while there is no need to risk drops of nitrogen coming into contact with the internal wall of the tube.

The regulating system comprises in accordance with FIG. 1 a temperature regulator 28 which receives its signal from a temperature sensor 27. The latter is mounted inside the evaporator in its lower parts and in the vicinity of the open end of the evaporator. The regulator 28, in its turn, controls a drive motor 29 which actuates the control valve 30 by means of which the amount of liquid nitrogen in the line 10 from the tank 31 to the evaporator 3 is controlled. The desired temperature in the evaporator is set on a scale on the temperature regulator. Depending on this set temperature value—the set point value—and the actual temperature in the evaporator, the temperature regulator 28 emits a signal to drive motor 29 which, in turn, actuates the control valve 30 which thus either increases or decreases the liquid nitrogen flow in the line 10 until a state of equilibrium prevails between the "actual" and the "set point" values.

With the method described heretofore and the apparatus for performance of the method the object has been achieved that oxidation of the interior surface of the tube is avoided in consequence of the inert properties of the nitrogen and that indications of rupture on account of oxidation on the inner surface are eliminated and that tangential tensile stresses in the tube in consequence of different cooling on the outside and inside surfaces are reduced. The new method and the new apparatus have made it possible to increase the feed velocity for the tube and thus to increase the production capacity. For some dimensions the increase has been as great as five times in comparison with previous arrangements and, moreover, the tubes have obtained a better quality. The method and the apparatus described here in connection with extrusion of plastic tubes is not confined to this product but may obviously also be applied in conjunction with all types of extruded tube-shaped objects, where efficient internal cooling is essential in order to accomplish both as high a product quality as possible and as high a production rate as possible. Moreover, the evaporator and gas conductor described in the foregoing for evaporation of the liquid nitrogen and for conduction of the evaporated nitrogen are also not confined to the embodiments specified and variations in certain respects are naturally possible within the framework of the inventive concept.

What is claimed is:

1. An apparatus for internally cooling a tube of hot plastic material extruded by an extruder nozzle, said apparatus comprising:

evaporator means mounted adjacent to said extruder nozzle so as to be within a tube of hot plastic material extruded by said extruder nozzle, said evaporator means including an elongated evaporating chamber having a cylindrical outer member with good thermal conductivity extending axially along and in spaced relation to the inner surface of said extruded tube so as to be heated by said hot extruded material, said spaced relation providing an annular cooling passage between the outermost surface of said outer member and the inner surface of said extruded tube along the greater portion of the axial length of said outer member, one end of said evaporating chamber being closed and the opposite end of said evaporating chamber having outlet openings for passing a nitrogen gas from said evaporating chamber into said cooling passage;

supply means for introducing a flow of liquid nitrogen into the closed end of said evaporating chamber, said supply means including at least one nozzle member positioned inside said evaporating chamber adjacent to its closed end and a supply line passing through said tube extruder nozzle for supplying liquid nitrogen to said at least one nozzle member;

regulating means for regulating said flow of liquid nitrogen so that substantially all of said liquid nitrogen is evaporated by said heated cylindrical outer member before reaching said outlet openings, said regulating means including a temperature-sensing member positioned in the vicinity of at least one of said outlet openings and said flow of said liquid nitrogen being regulated so that the temperature sensed by said sensing member is always higher than the evaporation temperature of said liquid nitrogen at the pressure prevailing in said extruded tube; and, means for causing said evaporated nitrogen to pass through said outlet openings and into said cooling passage so as to cool the inner surface of said extruded tube.

2. The apparatus of claim 1 in which said at least one nozzle member includes means for providing a tangential discharge of said liquid nitrogen into said evaporating chamber.

3. The apparatus of claim 1 in which a heat shield of a material with poor thermal conductivity is positioned between said extruder nozzle and the end of said evaporating chamber nearest to said extruder nozzle.

4. The apparatus of claim 3 in which the end of said evaporating chamber having said outlet openings is nearest to said extruder nozzle, and in which said supply means includes at least one nozzle means for liquid nitrogen positioned adjacent to the closed end of said evaporating chamber.

5. The apparatus of claim 4 which further includes an cylindrical guide plate positioned concentrically relative to said cylindrical outer member and extending axially from said heat shield and along said evaporating chamber for a sufficient distance to surround said outlet openings, an inner surface of said guide plate guiding evaporated nitrogen passing through said outlet openings in an axial direction away from said extruder nozzle.

6. The apparatus of claim 3 in which said evaporating chamber has a tubular inner member positioned concentrically relative to said cylindrical outer member and open at both ends, in which the closed end of said evaporating chamber is nearest to said extruder nozzle and in spaced relation to said heat shield, in which said liquid nitrogen is introduced into said evaporating chamber through at least one nozzle means adjacent to its closed end, and in which said evaporator means includes a seal means extending radially between the end of said evaporating chamber having said outlet openings and the inner surface of said extruded tube so that evaporated nitrogen passing through said outlet openings is caused to flow toward said heat shield, between said heat shield and the closed end of said evaporating chamber, and through said tubular inner member.

7. The apparatus of claim 1 which further includes a drag plug positioned within said extruded tube at a relatively large distance from said evaporating chamber so as to provide nitrogen cooling of the inner surface of said extruded tube between said evaporating chamber and said drag plug, and in which said drag plug includes an over-pressure valve which is set at the over-pressure desired within said extruded tube between said evaporating chamber and said drag plug.

* * * * *